(12) United States Patent
DiCosimo et al.

(10) Patent No.: US 7,790,833 B2
(45) Date of Patent: Sep. 7, 2010

(54) PROCESSES FOR THE POLYMERIZATION OF TRIMETHYLENE CARBONATE TO POLY(TRIMETHYLENE GLYCOL CARBONATE TRIMETHYLENE GLYCOL ETHER) DIOL

(75) Inventors: Robert DiCosimo, Chadds Ford, PA (US); Neville Everton Drysdale, Newark, DE (US); Hari Babu Sunkara, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/277,644

(22) Filed: Nov. 25, 2008

(65) Prior Publication Data

US 2009/0143564 A1 Jun. 4, 2009

Related U.S. Application Data

(60) Provisional application No. 60/991,687, filed on Nov. 30, 2007.

(51) Int. Cl.
*C08G 64/00* (2006.01)
*C08G 63/02* (2006.01)

(52) U.S. Cl. .................. 528/196; 526/314; 528/405; 528/425; 568/595

(58) Field of Classification Search ............... 526/314; 528/405, 425; 568/595
See application file for complete search history.

(56) References Cited

U.S. PATENT DOCUMENTS 5,672,782 A * 9/1997 Hattori et al. ............... 568/899

6,451,949 B2 * 9/2002 Boon et al. ................. 526/314
2009/0143555 A1 * 6/2009 DiCosimo et al. .......... 526/314
2009/0143624 A1 * 6/2009 DiCosimo et al. .......... 568/595

FOREIGN PATENT DOCUMENTS

EP 0600417 A 6/1994
WO 0164771 A 9/2001

OTHER PUBLICATIONS

Hajime Yasuda, Mohad-Serah Aludin, Naoyuki Kitamura, Mari Tanabe, and Hiroyuki Sirahama, Department of Applied Chemistry, Faculty of Engineering, Hiroshima University, Higashi-Hiroshima, 739-8527, Japan Macromolecules, 1999, 32 (19), pp. 6047-6057.*
abstract: Homopolymerization of 1,8Dioxan-2-one to High Molecular Weight Poly(Trimethylene Carbonate) Authors: Ann-Christine Albertson et al., Journal of Macromolecular Science, Part A, vol. 29, Issue 1 Jan. 1992 , pp. 43-54.*
A-C Albertsson et al., Homopolymerization of 1,3-Dioxan-2-one to High Molecular Weight Poly(Trimethylene Carbonate), Journal of Macromolecular Science: Part A—Chemistry, Marcel Dekker, New York, NY, vol. A29, No. 1, Jan. 1, 1992, pp. 43-54.
Ariga et al., Cationic Ring-Opening Polymerization of Cyclic Carbonates With Alkyl Halides to Yield Polycarbonate Without the Ether Unit By Suppression of Elimination of Carbon Bioxide, Macromolecules, 1997, vol. 30:737-744.
Kricheldorf et al., Polylactones. 16. Cationic Polymerization of Trimethylene Carbonate and Other Cyclic Carbonates, J. Macromol. Sci. Chem., 1989, vol. 26:631-644.

* cited by examiner

*Primary Examiner*—Terressa M Boykin
(74) *Attorney, Agent, or Firm*—Gail D. Tanzer

(57) ABSTRACT

This invention relates to solventless processes for the polymerization of an unsubstituted or substituted trimethylene carbonate to an unsubstituted or substituted poly(1,3-propanediol carbonate 1,3-propanediol ether)diol, using one or more solid acid catalysts.

10 Claims, No Drawings

PROCESSES FOR THE POLYMERIZATION OF TRIMETHYLENE CARBONATE TO POLY(TRIMETHYLENE GLYCOL CARBONATE TRIMETHYLENE GLYCOL ETHER) DIOL

This application claims the benefit of U.S. Provisional Application No. 60/991,687, filed Nov. 30, 2007, herein incorporated by reference.

FIELD OF THE INVENTION

This invention relates to solventless processes for the polymerization of trimethylene carbonates to a poly(trimethylene glycol carbonate trimethylene glycol ether)diols, the process using one or more solid acid catalysts.

BACKGROUND

There exists a need to produce dihydroxy-terminated materials. The materials described herein, poly(trimethylene glycol carbonate trimethylene glycol ether)diol, can be used in a number of applications, including but not limited to biomaterials, engineered polymers, personal care materials, coatings, lubricants and polycarbonate/polyurethanes (TPUs).

As described in Ariga et al., Macromolecules 1997, 30, 737-744 and in Kricheldorf et al., J. Macromol. Sci.—Chem A 26(4), 631-644 (1989), in the cationic polymerization of TMC, the initiating agent becomes incorporated into the polymer ends.

SUMMARY OF THE INVENTION

One aspect of the present invention is a process for making a poly(trimethylene glycol carbonate trimethylene glycol ether)diol of structure

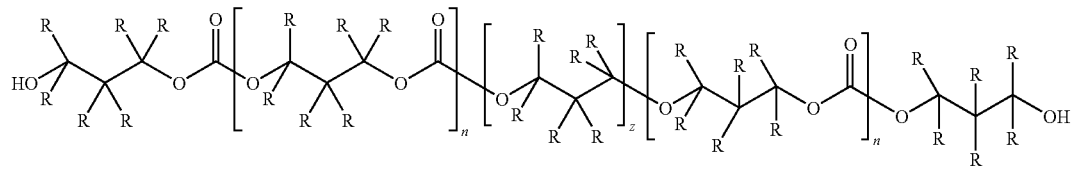

wherein z is an integer of about 1 to 10; n is an integer of about 2 to 100; and each R substituent is independently selected from the group consisting of H, $C_1$-$C_{20}$ alkyl, $C_3$-$C_{20}$ cyclic alkyl, $C_5$-$C_{25}$ aryl, $C_6$-$C_{20}$ alkaryl, and $C_6$-$C_{20}$ arylalkyl, and wherein each R substituent can optionally form a $C_3$-$C_8$ cyclic structural group (for example, cyclopropane, cyclobutane, cyclopentane, cyclohexane, cycloheptane and cyclooctane) with adjacent R substituents;

the process comprising: contacting trimethylene carbonate or an R-substituted trimethylene carbonate with a solid acid catalyst at a temperature greater than the melting point of the trimethylene carbonate or R-substituted trimethylene carbonate, to form a mixture comprising a poly(trimethylene glycol carbonate trimethylene glycol ether)diol oligomer composition.

Generally, the temperature is about 30 degrees Celsius or greater.

DETAILED DESCRIPTION

The present invention relates to a process to make a poly(trimethylene glycol carbonate trimethylene glycol ether)diol from a trimethylene carbonate (TMC, 1,3-dioxan-2-one) at elevated temperature (generally 30 to 250 degrees Celsius) polymerization, in the absence of solvent, utilizing a solid acid catalyst. The reaction can be represented by the equation below:

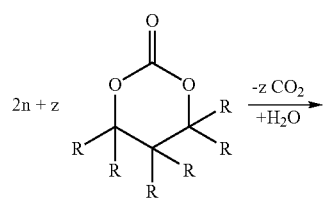

-continued

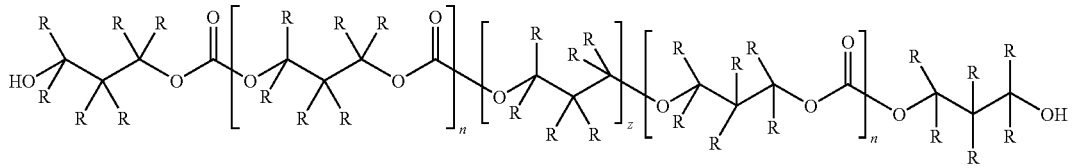

In the structure above, each R substituent is independently selected from the group consisting of H, $C_1$-$C_{20}$ alkyl, particularly $C_1$-$C_6$ alkyl, $C_3$-$C_{20}$ cyclic alkyl, $C_3$-$C_6$ cyclic alkyl, $C_5$-$C_{25}$ aryl, particularly $C_5$-$C_{11}$ aryl, $C_6$-$C_{20}$ alkaryl, particularly $C_6$-$C_{11}$ alkaryl, and $C_6$-$C_{20}$ arylalkyl, particularly $C_6$-$C_{11}$ arylalkyl, and each R substituent can optionally form a cyclic structural group with adjacent R substituents. Typically such cyclic structural groups are $C_3$-$C_8$ cyclic groups, e.g., cyclopropane, cyclobutane, cyclopentane, cyclohexane, cycloheptane, and cyclooctane.

In the structure above, n is an integer of about 2 to 100, and particularly about 2 to 50; and z is an integer of about 1 to about 20, particularly about 1 to 7, more particularly about 1 to 5.

The poly(trimethylene glycol carbonate trimethylene glycol ether)diol can be isolated using known methods.

TMC is prepared by any of the various chemical or biochemical methods known to those skilled in the art. Chemical methods for the preparation of TMC include, but are not limited to, a) reacting 1,3-propanediol with diethylcarbonate in the presence of zinc powder, zinc oxide, tin powder, tin halide or an organotin compound at elevated temperature, b) reacting 1,3-propanediol and phosgene or bis-chloroformates to produce a polycarbonate intermediate that is subsequently depolymerized using heat and, optionally, a catalyst, c) depolymerizing poly(trimethylene carbonate) in a wiped film evaporator under vacuum, d) reacting 1,3-propanediol and urea in the presence of metal oxides, e) dropwise addition of triethylamine to a solution of 1,3-propanediol and ethylchloroformate in THF, and f) reacting 1,3-propanediol and phosgene or diethylcarbonate. Biochemical methods for the preparation of TMC include, but are not limited to, a) lipase catalyzed condensation of diethylcarbonate or dimethylcarbonate with 1,3-propanediol in an organic solvent, and b) lipase-catalyzed depolymerization of poly(trimethylene carbonate) to produce TMC. The 1,3-propanediol and/or trimethylene carbonate (TMC) can be obtained biochemically from a renewable source ("biologically-derived" 1,3-propanediol).

Preferably the 1,3-propanediol used as the reactant or as a component of the reactant will have a purity of greater than about 99%, and more preferably greater than about 99.9%, by weight as determined by gas chromatographic analysis.

The 1,3-propanediol preferably has the following characteristics:

(1) an ultraviolet absorption at 220 nm of less than about 0.200, and at 250 nm of less than about 0.075, and at 275 nm of less than about 0.075; and/or (2) a CIELAB "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

Examples of other solid acid resins useful as catalysts in the processes disclosed herein include sulfonated tetrafluoroethylene copolymers, for example, Nafion® SAC-13 or NAFION® NR50 (tetrafluoroethylene/perfluoro(4-methyl-3,6-dioxa-7-octene-1-sulfonic acid) copolymer, an ionomer available from E.I. DuPont de Nemours Company, Wilmington, Del., and poly(styrenesulfonic acid) crosslinked with divinylbenzene, for example, the hydrogen form of DOWEX® 50WX8-200, DOWEX® Marathon C, DOWEX® HCR-W2, DIAION® SK1B, DIAION® PK228, Purolite® C-100, IONAC® C-250, Amberlyst™ 70, and Monoplus S100H.

Preferred are sulfonated tetrafluoroethylene copolymers, for example NAFION® N R50 (tetrafluoroethylene/perfluoro(4-methyl-3,6-dioxa-7-octene-1-sulfonic acid) copolymer, an ionomer available from DuPont, Wilmington, Del.), and DOWEX® 50WX8-200 (an ion-exchange resin consisting of poly(styrenesulfonic acid) crosslinked with divinylbenzene) available from Acros Organics N.V., Fair Lawn, N.J. The processes disclosed herein are desirably carried out substantially or totally in the absence of a solvent ("solventless").

The process described herein occurs at elevated temperature, generally above the melting point of the monomers used, typically from about 30 to 250 degrees Celsius, and frequently about 50 to 150 degrees Celsius, preferably about 100 to 150 degrees Celsius. Once the reactants are added together, they may be mixed by any convenient method. The process can be done in batch, semi-batch or continuous mode, and generally take place in an inert atmosphere (i.e., under nitrogen). Once the reactants have been contacted with the catalyst, the reaction is allowed to continue for the desired time. Generally, at least 6 percent of the TMC polymerizes to give the desired poly(trimethylene glycol carbonate trimethylene glycol ether)diol after about 3 to 6 hours, with greater than about 75 percent conversion achieved within about 25 hours. As shown in the examples below, 100 percent conversion is easily achieved by the proper selection of catalyst, the amount of catalyst, and the reaction temperature and time.

Additionally, the desired degree of polymerization, m, can be achieved by varying the temperature. As shown in the examples below, higher temperatures afford higher conversions and lower m values, e.g., about 0.5 or greater. In the present embodiments, n is an integer generally between about 2 and 100, and more specifically between about 2 and 50; and z is about 1 to about 20, more specifically between about 1 and 10.

The resulting poly(trimethylene glycol carbonate trimethylene glycol ether)diols are easily separated from the unreacted starting materials and catalyst by any convenient means, such as filtration, including filtration after concentration.

The processes disclosed herein allow for the degree of polymerization to be selected based on the solvent and/or catalyst chosen, and the amount of those materials used. This is advantageous as the materials resulting from the process can vary in properties including viscosity, and can find wide uses in products such as personal care, coatings (including thermoplastic polyurethanes), elastomers and lubricants. The diol produced, can find wide uses in products such as biomaterials, engineered polymers, personal care materials, coatings, lubricants and polycarbonate/polyurethanes (TPUs).

EXAMPLES

The processes carried out in the following examples can be represented by the equation:

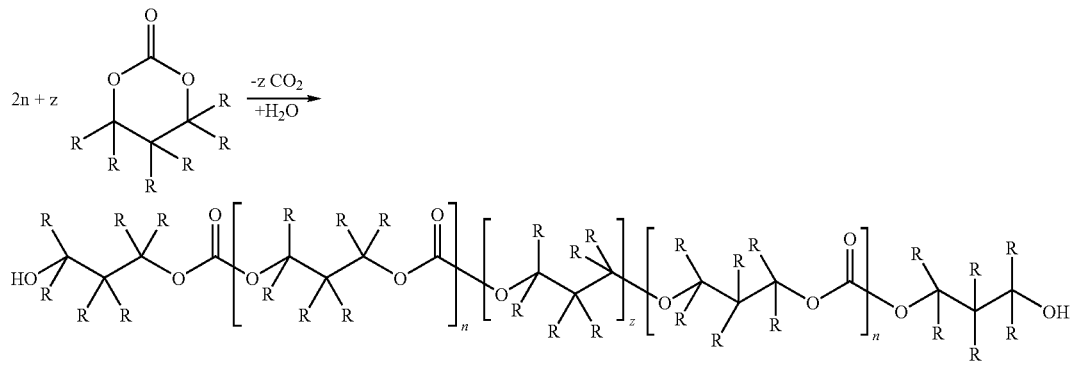

In the structure above, each R is independently selected from the group consisting of H, $C_1$-$C_{20}$ alkyl, particularly $C_1$-$C_6$ alkyl, $C_3$-$C_{20}$ cyclic alkyl, $C_3$-$C_6$ cyclic alkyl, $C_5$-$C_{25}$ aryl, particularly $C_5$-$C_{11}$ aryl, $C_6$-$C_{20}$ alkaryl, particularly $C_6$-$C_{11}$ alkaryl, and $C_6$-$C_{20}$ arylalkyl, particularly $C_6$-$C_{11}$ arylalkyl, and each R substituent can optionally form a cyclic structure with adjacent R substituents.

In the structure above, n is an integer of about 2 to 100, and more particularly about 2 to 50; and z is an integer of about 1 to about 10, particularly about 1 to 7, more particularly about 1 to 5.

The DSC runs were made on a TA Instruments Q2000 DSC, using a 10° C./min heating rate and an $N_2$ purge. The profile used was heat, cool and reheat from −90 to 100° C. The TGA runs were made on a TA Instruments Q5000 TGA, again using a 10° C./min heating rate and an $N_2$ purge.

Examples 1-3

These examples demonstrate the production of poly(trimethylene glycol carbonate trimethylene glycol ether)diol using Nafion® NR50 ion exchange resin as catalyst at various temperatures without the use of a solvent.

Trimethylene carbonate (40.00 g, 0.392 mol) and Nafion® NR 50 (4.00 g) were placed in three separate flasks equipped with mechanical stirrers and under nitrogen. The flasks were placed in oil baths maintained at 100, 120 and 140° C. Aliquots were withdrawn occasionally and analyzed by Proton NMR, the results of which are tabulated below:

| Example | Temperature, Degrees Celsius | Reaction Time, (Hr) | Conversion (%) | Reaction Time (Hr) | Conversion (%) |
|---|---|---|---|---|---|
| 1 | 100 | 1 | 69.98 | 4 | 100 |
| 2 | 120 | 1 | 94.53 | 5 | 97.72 |
| 3 | 140 | 1 | 96.67 | 4 | 100 |

The molecular weights of the materials made in Examples 1-3 were determined, as was the value of "m" for each material. The results are found in the Table below.

| Example | Temperature, Degrees Celsius | Molecular Weight, Mw |
|---|---|---|
| 1 | 100 | 3852 |
| 2 | 120 | 3467 |
| 3 | 140 | 3246 |

Thermal analyses (TGA's, performed at a heating rate of 10° C. per minute) of Examples 1 and 2 showed the materials to be thermally stable, as tabulated in the following Tables:

| Example 1 | Weight Lost (Decomposition) Temp (degrees Celsius) | | |
|---|---|---|---|
| | 10% | 50% | 90% |
| Under Air | 284.75 | 333.86 | 359.59 |
| Under Nitrogen | 319.68 | 353.38 | 372.40 |

| Example 2 | Weight Lost (Decomposition) Temp (degrees Celsius) | | |
|---|---|---|---|
| | 10% | 50% | 90% |
| Under Air | 299.54 | 343.97 | 366.49 |
| Under Nitrogen | 303.76 | 342.14 | 365.90 |

What is claimed is:

1. A process for making a poly(trimethylene glycol carbonate trimethylene glycol ether) diol of structure

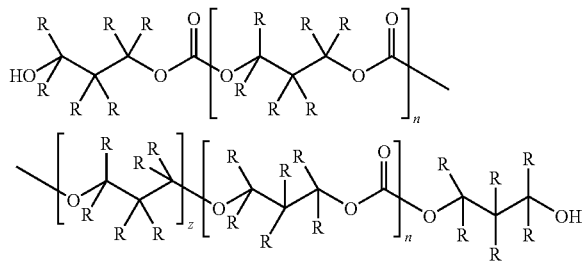

wherein z is an integer of about 1 to 10; n is an integer of about 2 to 100; and each R is independently selected from the group consisting of H, $C_1$-$C_{20}$ alkyl, $C_3$-$C_{20}$ cyclic alkyl, $C_5$-$C_{25}$ aryl, $C_6$-$C_{20}$ alkaryl, and $C_6$-$C_{20}$ arylalkyl, and wherein each R substituent can optionally form a $C_3$-$C_8$ cyclic structural group with adjacent R substituents;

the process comprising: contacting trimethylene carbonate or an R-substituted trimethylene carbonate with a solid acid catalyst at a temperature greater than the melting point of the trimethylene carbonate or R-substituted trimethylene carbonate, to form a mixture comprising a poly(trimethylene glycol carbonate trimethylene glycol ether) diol oligomer composition.

2. The process of claim 1, wherein the trimethylene carbonate is unsubstituted trimethylene carbonate.

3. The process of claim 1, wherein the solid acid catalyst is selected from the group consisting of ion-exchange resins comprising poly(styrenesulfonic acid) crosslinked with divinylbenzene.

4. The process of claim 1, wherein the solid acid catalyst is a tetrafluoroethylene/perfluoro(4-methyl-3,6-dioxa-7-octene-1-sulfonic acid) copolymer.

5. The process of claim 1, further comprising isolating the poly(trimethylene glycol carbonate trimethylene glycol ether) diol oligomer.

6. The process of claim 1, wherein the temperature is greater than 30 degrees Celsius.

7. A poly(trimethylene glycol carbonate trimethylene glycol ether) diol made by the process claim 1.

8. The process of claim 1, wherein the solid acid catalyst contains sulfonic acid groups.

9. The process of claim 1, wherein the solid acid catalyst is a polymer.

10. The process of claim 1 wherein no additional solvent is present.

* * * * *